Jan. 6, 1970  J. H. MATTHEWS  3,487,976

LEVEL CONTROL SYSTEM FOR GRAVITY CONVEYOR

Filed Feb. 28, 1969  2 Sheets-Sheet 1

INVENTOR.
JOHN HORTON MATTHEWS.
BY
SETTLE, BATCHELDER & OLTMAN.
ATT'YS.

INVENTOR.
JOHN HORTON MATTHEWS
BY
SETTLE, BATCHELDER & OLTMAN.
ATT'YS.

United States Patent Office 3,487,976
Patented Jan. 6, 1970

3,487,976
LEVEL CONTROL SYSTEM FOR GRAVITY CONVEYOR
John Horton Matthews, Royal Oak, Mich., assignor to Multifastener Corporation, Detroit, Mich., a corporation of Michigan
Continuation-in-part of application Ser. No. 624,004, Mar. 17, 1967. This application Feb. 28, 1969, Ser. No. 803,387
Int. Cl. G07f 11/00
U.S. Cl. 221—10           8 Claims

ABSTRACT OF THE DISCLOSURE

An electrical system is provided which controls a feeding device supplying magnetic objects, such as pierce nuts, to a chute or other receptacle so that the feeding device is turned on when objects stacked in the chute drop below a minimum level and is turned off when the stack of objects rises to a maximum level. Inductor coils are wound about the chute at the minimum and maximum levels and act to sense the presence or absence of objects at those levels. Switching means controls the energization and de-energization of the feeding device and is in turn controlled by the sensor coils. In a preferred embodiment, the switching means includes an alternating current semiconductor switch to be connected to the feeding device, a pair of direct current semiconductor switches respectively coupled to the coils, and a relay connected in circuit with the direct current semiconductor switches and having contacts connected to the alternating current semiconductor switch to operate the same in response to signals supplied from the coils to the direct current switches. The coils form part of a bridge circuit which supplies the signals for operating the switching means when the bridge circuit is in a predetermined condition of balance or unbalance.

RELATED APPLICATION

This application is a continuation-in-part of a co-pending application Ser. No. 624,004 now Patent No. 3,430,808 filed Mar. 17, 1967, and assigned to the present assignee.

BACKGROUND OF THE INVENTION

One application for the invention is in the feeding of pierce nuts to a punch press which installs the nuts in panels by a punching operation. Nuts are typically fed to the punch press through a chute to which nuts are supplied from a rotary hopper. Ordinarily, the nuts feed by gravity down through the chute to the punch press, and the feeding rate is great enough so that nuts stack up in the chute. The hopper runs continuously and keeps the chute full of nuts. However, continuous operation of the hopper causes problems. The nuts in the hopper are tumbled over and over as the hopper rotates, and this tumbling action can cause the nuts to wear excessively. Pierce nuts should have sharp edges since they punch their own hole in a panel when they are installed in the panel, but these edges can become dulled from wear due to the tumbling action of the rotary hopper. Also, portions of the nut thread may be peened over, or there may be some chipping of metal or other damage to the nuts because of excessive tumbling.

SUMMARY OF THE INVENTION

The invention of the co-pending application alleviates these problems by providing a level control system which shuts off the feeding device when sufficient nuts are in the chute and turns it on only when nuts are actually needed in the chute. As previously mentioned, the nuts stack up in the chute. A minimum level for the top of the stack is selected, and the feeding device is turned on to supply additional nuts to the chute whenever the stack of nuts falls belows the minimum level. Once the feeding device has been turned on, it remains on until the stack of nuts rises to a maximum level beyond which there is no need for further nuts. The feeding device is then turned off and remains off until the stacks of nuts again falls below the minimum level.

In such a level control system, there is a need for a simple and yet reliable sensor to provide the minimum level and maximum level sensing functions. This need is fulfilled by using simple inductor coils as the minimum and maximum level sensors. The coils are wound around the chute and are placed at minimum and maximum levels on the chute. The impedance values of these coils vary depending on whether nuts are present or absent in the coils. The system is so designed that when no nuts are present in either of the sensing coils the hopper is turned on to feed nuts to the chute. When nuts fill both of the coils, the rotary hopper is turned off. The turn on condition occurs when the stack of nuts in the chute falls below the minimum level sensor, and the turn off condition occurs when the stack of nuts rises in the chute above the maximum level sensor. The hysteresis effect is achieved by appropriate design of the control circuitry which is operated by the minimum and maximum level sensors as will be described.

The present invention utilizes the features and advantages of the invention of the co-pending application identified above, and provides an electrical control system which is believed to be more suitable for practical applications than those disclosed in the co-pending application. In accordance with the present invention, the electrical control system includes a bridge circuit in which sensing coils are connected, the sensing coils being in parallel arms of the bridge circuit rather than in opposed arms as in the co-pending application. The bridge circuit is applied with power through a transformer, the secondary winding of which is tapped such that portions thereof also form arms of the bridge circuit. Switching means is operated by the bridge circuit to actuate and de-actuate a control device which may be the nut feeding device. The switching device preferably includes an alternating current semiconductor switch connected to the control device, at least two direct current semiconductor switches controlled by the bridge circuit, and a relay operated by the D.C. switches to in turn operate the A.C. switch. For the nut feeding application, feeding commences when the bridge circuit is in a predetermined condition of unbalance and ceases when the bridge is balanced. However, the reverse conditions may be employed in other applications.

Accordingly, it is an object of the present invention to provide an improved electrical control system for controlling the feeding of magnetic objects just as nuts to a utilization device.

Another object of the invention is to provide a level control system utilizing semiconductor switches as active electron devices in the control circuitry.

A further object of the invention is to provide a control circuit with switching means controlled by a bridge circuit, the switching means including at least one alternating current semiconductor switch and at least two direct current semiconductor switches.

Still another, and no less important, object of the invention is to incorporate sensing coils in a bridge circuit in a manner which facilitates operation of the direct current semiconductor switches mentioned above.

Other objects of this invention will appear in the following description and appended claims, reference being had to the accompanying drawings forming a part of this specification wherein like reference characters designate corresponding parts in the several views.

Figure 1:
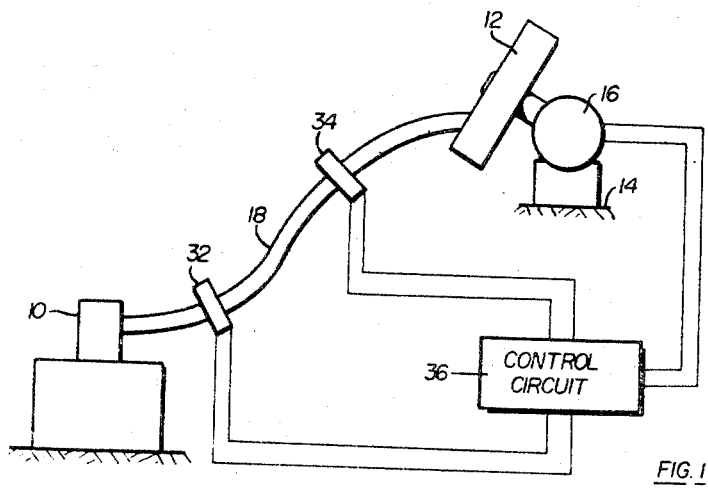
FIGURE 1 is a schematic view of nut feeding apparatus provided with a level control system in accordance with the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawing:

FIGURE 1 schematically shows nut feeding apparatus provided with a level control system in accordance with the invention. Nuts are fed to a punch press 10 from a rotary hopper 12 which is mounted on a platform or floor 14 located near the punch press 10. The hopper 12 is driven by a motor 16, and as the hopper 12 rotates it feeds nuts into a chute 18 which extends in a generally vertical direction and leads from the hopper 12 to the punch press 10.

Figure 2:
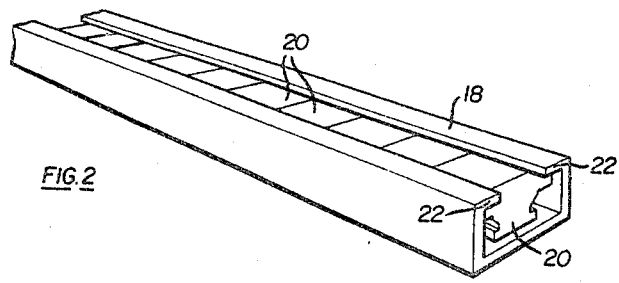
FIGURE 2 is a perspective view of a length of chuting filled with pierce nuts.

A portion of the chute 18 is shown in FIGURE 2, and it may be seen that this section of the chute 18 is filled with nuts 20. The nuts fit loosely in the chute and feed by gravity downwardly through the chute to the punch press. The chute 18 is preferably made of a strong plastic material which is somewhat flexible so as to allow the chute to be bent slightly. The chute has flanges 22 which are spaced apart as shown, and the nuts 20 are visible through the space between the flanges.

Figure 3:
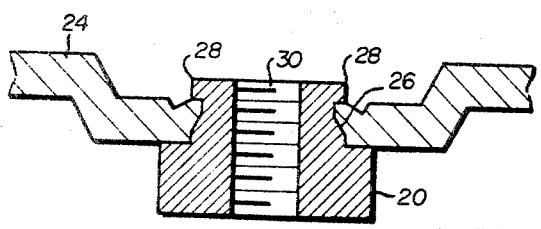
FIGURE 3 is a sectional view showing a pierce nut fastened in a panel.

FIGURE 3 shows one of the nuts 20 after it has been installed in a metal panel 24 by a punching operation in which the nut itself serves as a punch. Since the nut 20 punches out the opening 26 in which it fits, it is desirable for the edges and corners 28 of the nut to be sharp. If the hopper 12 were rotated continuously so as to keep the chute 18 full of nuts at all times, there would be a tendency for the edges and corners of the nuts to become dulled due to the tumbling action of the nuts in the hopper. Also, the threads 30 of the nuts may become peened over, and there is a risk of general wear and damage to the nuts.

In order to reduce the wear on the nuts, a level control system is provided which causes the rotary hopper 12 to operate only when nuts are needed in the chute 18. The level control system includes two sensors 32 and 34 and a control circuit 36 which is connected to the sensors and to the motor 16 of the rotary hopper 12. The sensors 32 and 34 are simple inductor coils which are wound about the chute 18 at two different places spaced along the length of the chute. Sensor coil 32 is placed at a low position on the chute below which the stack of nuts in the chute 18 are not to fall in normal operation of the apparatus. Sensor coil 34 is placed at a high position on the chute 18 beyond which the stack of nuts in the chute is not to rise in normal operation of the apparatus. The nuts 20 are made of a magnetic material, ordinarily steel, and nuts act as a core for the coils 32 and 34 when the nuts are present within the coils. Thus, the impedance values of the coils 32 and 34 vary depending on whether or not there are nuts present within the coils. The characteristics of the coils are such that a single nut falling down through chute 18 and passing through the coils 32 and 34 does not change the impedance of the coils sufficiently to actuate the control circuit 36. However, when nuts of a stack thereof are present within a given coil, its impedance value changes sufficiently to actuate the control circuit 36 in a manner to be described more fully hereinafter.

In the general operation of the level control system, the control circuit 36 is actuated to start the motor 16 of the rotary hopper 12 when the stack of nuts within the chute 18 falls below the lower coil 32. In this condition both coils 32 and 34 have no nuts within them. As nuts are fed from the hopper 12 into the chute 18, the stack of nuts rises into and past the lower coil 32 causing its impedance value to change. The control circuit 36 is so designed that this single impedance change does not cause it to turn off the hopper motor 16. The stack of nuts continues to rise in the chute 18 until it fills and passes the upper coil 34, and at this time both of the coils 32 and 34 are full of nuts. In this condition, the control circuit 36 is actuated to shut off the motor 16 of the hopper to thereby stop the supply of nuts to the chute.

As nuts are accepted from the chute by the punch press 10, the stack of nuts in the chute falls and a condition arises wherein there are no nuts within the upper coil 34 but the lower coil 32 does have nuts within it. In this condition, the control circuit 36 does not turn on the hopper motor 16. The hopper motor is not turned on until both coils 32 and 34 are empty, and of course this condition occurs when the stack of nuts falls below the lower coil 32. Thus, the hopper motor 16 is turned on when both coils 32 and 34 are empty and is turned off when both coils 32 and 34 are full.

Figure 4:
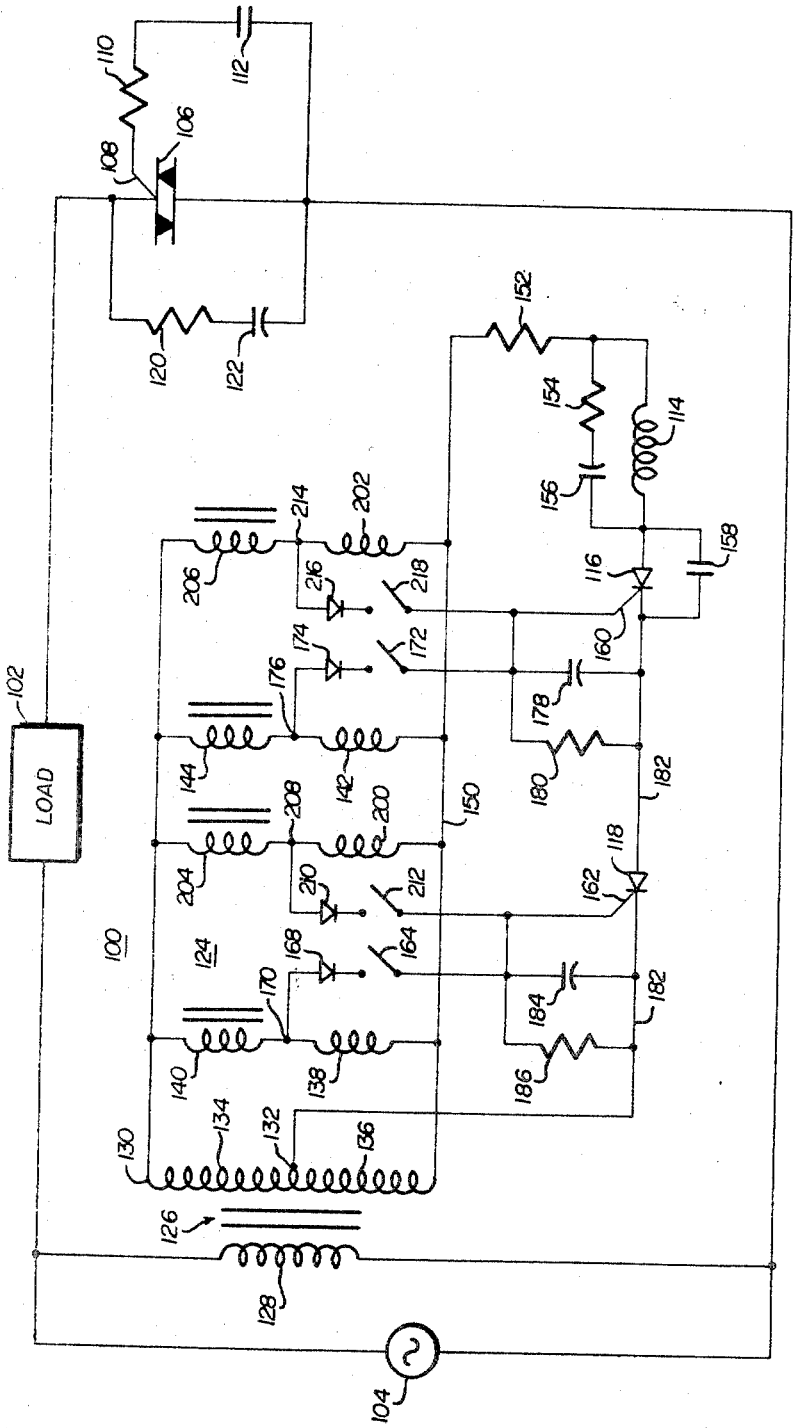
FIGURE 4 is a schematic diagram of a control circuit for the system of FIGURE 1 and in accordance with a preferred embodiment of the invention.

Referring now to FIGURE 4, there is shown a control circuit 100 in accordance with a preferred embodiment of the invention. In FIGURE 4, the load 102 includes the starting contacts for the motor of the feeding device described previously in connection with FIGURE 1. The load 102 is connected in series with a signal source 104 and an alternating current semi-conductor switch 106 which may be a semi-conductor device of the type referred to as a triac. The semi-conductor switch 106 has a control portion 108 connected in series with a resistor 110 and normally open contacts 112 of a relay, the coil 114 of which is connected in series with two direct current semi-conductor switches 116 and 118. It is apparent that the contacts 112 are shown distributed from the relay coil 114. Resistor 110 and contacts 112 are connected from control portion 108 to the main conduction path of semi-conductor switch 106. The semi-conductor switch 106 conducts alternating current, and a resistor 120 and capacitor 122 are connected in series with each other across the semi-conductor switch 106 for filtering purposes. The semi-conductor switch 106. The semi-conductor switch 106 and conducts only current when the normally open contacts 112 are closed in response to energization of the relay coil 114, as will be described further.

The control circuit 100 includes a bridge circuit which is designated generally as 124. The bridge circuit 124 may be coupled to the signal source 104 by a transformer 126 which includes a primary winding 128 shown connected across the signal source 104 and a secondary winding 130 having a center tap 132. The portions 134 and 136 of secondary winding 130 form two arms of the composite bridge circuit 124.

A high level sensing coil 138 and a balancing coil 140 are connected in series with each other across the secondary winding 130. A low level sensing coil 142 and a low level balancing coil 144 are connected in series with each other across the secondary winding 130 and in parallel with windings 138 and 140. Sensing coil 138 and balancing coil 140 thus form two arms of the bridge circuit 124, and sensing coil 142 and balancing coil 144 form two additional arms of the bridge circuit 124. It is apparent that the bridge circuit 124 is a composite bridge circuit in which secondary winding 140 is common to the branch containing coils 138 and 140 and also the branch containing coils 142 and 144.

The direct current semi-conductor switches 116 and 118 have the anode-to-cathode paths thereof connected in series with each other and in series with the relay coil 114. The series combination of elements 114, 116 and 118 is connected between the center tap 132 of secondary winding 130 and the lower end of secondary winding 130 as extended by bus 150. A resistor 152 is provided in this path for limiting current, and a series connected resistor 154 and capacitor 156 are connected across relay coil 114 to smooth out the half-wave direct current which is conducted by direct current switches 116 and 118 sufficiently to hold in the relay of which coil 114 is a part after this relay has been actuated.

Relay 114 has a second set of normally open contacts 158 which are connected across the anode-to-cathode portion of semi-conductor switch 116. The purpose of these relay contacts will be described later.

Semi-conductor switches 116 and 118 may be of the type normally referred to as semi-conductor controlled rectifiers or silicon controlled rectifiers (SCR). Semi-conductor switch 116 has a control portion 160 and semi-conductor switch 118 has a control portion 162. Control portion 162 is connected via a normally open switch 164 to a rectifier 168, the anode of which is connected to a point 170 between sensing coil 138 and balancing coil 140. Similarly, control portion 160 for semi-conductor switch 116 is connected via a normally open switch 172 to a rectifier 174, the anode of which is connected to a point 176 between sensing coil 142 and balancing coil 144. The rectifiers 168 and 174 serve to rectify current signals which are supplied to the control portions 160 and 162 when the bridge circuit 124 is in a predetermined condition of balance or unbalance, as will be described. A capacitor 178 and a resistor 180 are connected in parallel with each other between the control portion 160 and the main conduction path 182. Similarly, a capacitor 184 and a resistor 186 are connected in parallel with each other between control portion 162 and the main conduction path 182. Elements 178, 180, 184 and 186 serve to smooth out the signals which are supplied to control portions 160 and 162 and also provide sensitivity control. The control portions 160 and 162 are referred to as gates where the D.C. switches 116 and 118 are silicon-controlled rectifiers.

In operation, an alternating current signal from the source 104 flows through the primary winding 128 of transformer 126, and this signal may have a voltage, by way of example, of about 120 volts. The signal is coupled to the secondary winding 130 and the voltage appearing across the portions 134 and 136 of the secondary winding may each have a value of about 12 volts, for example. In the embodiment being described, the balancing coils 140 and 144 have iron cores. The sensing coils 138 and 142 are respectively positioned on the chute 18 (FIGURE 1) such that coil 138 corresponds to coil 34 and coil 142 corresponds to coil 32. When coils 138 and 142 are both full of nuts, their impedance values balance with the impedance values of coils 140 and 144 such that the bridge circuit 124 is balanced. (It is assumed for purposes of the present description that only one chute is provided.) Switches 164 and 172 are closed. The machine 10 uses up nuts from the chute 18 such that the level of nuts in the chute falls, and it will be assumed that the level of nuts falls below the level of coil 142 so that both coils are in their empty or nearly empty condition. In this condition, the bridge circuit 124 is unbalanced, and signals are supplied through rectifiers 168 and 174 to the control portions 162 and 160 of SCR's 118 and 116. These signals positively bias the gates 160 and 162 to turn on the SCR's thus causing current to flow through relay coil 114. This pulls in relay 114 such that contacts 112 and 158 close. The closing of contacts 112 causes A.C. semi-conductor switch 106 to start conducting, and this in turn starts the motor in load 102 for operating the nut feeding device 12. The device 12 supplies nuts into the chute 18 causing nuts to fill coil 142 until its impedance value matches that of balancing coil 144. In this condition, no signal is supplied through rectifier 174, and the SCR 116 turns off. However, contacts 158 are closed, so conduction through relay coil 114 and SCR 118 continues.

As nuts continue to be supplied to chute 18 from feeder device 12, the nuts eventually fill coil 138 until its impedance value balances that of coil 140. In this condition, current ceases to flow through rectifier 168, and this causes SCR 118 to turn off. When SCR 118 turns off, current through relay coil 114 ceases, so this relay drops out and contacts 112 and 158 open. The opening of contacts 112 causes A.C. semiconductor switch 106 to cease conduction, and this turns off the motor included in load 102 for operating the nut feeding device 12. This completes a cycle of operation of the level control system, but it will be understood that the system continues operating in the manner just described.

It may be noted at this point that coils 140 and 144 could be used minus cores as sensing coils with empty coils 138 and 142 being used as balancing coils such that a reverse type of actuation is obtained; i.e., the circuit is unbalanced when the sensing coils are full of magnetic objects and is balanced when the sensing coils are empty.

It may be seen in FIGURE 4 that additional sensing coils 200 and 202 and balancing coils 204 and 206 are provided in the illustrated embodiment. Coils 200 and 204 are connected in series across secondary winding 130, and coils 202 and 206 are also connected in series across secondary winding 130. The center junction 208 is connected through a rectifier 210 and switch 212 to the gate 162, and the center junction 214 is connected through a rectifier 216 and a switch 218 to the gate 160. It is apparent that the coils 200, 202, 204 and 206 duplicate the coils 138, 142, 140 and 144. Coils 200 and 202 may be provided on a separate chute which is fed with nuts from a nut feeding device in exactly the same manner as has been described previously. Thus, the circuit 100 is adapted to control the flow of nuts in more than one chute, and it will be understood that several additional chutes could be controlled if desired by including appropriate duplicate circuitry in the manner described above. In such an embodiment, feeding will start when any lower coil is empty and cease when all upper coils are filled.

Thus, the invention provides an improved electrical control system which is particularly useful in controlling the feeding of nuts or other objects of magnetic material through a receptacle to a utilization device. The electrical control system includes a control circuit which takes advantage of the desirable properties of semi-conductor switches, and which can be constructed economically on a commercially practical basis.

Having thus described our invention, I claim:

1. A level control system comprising a generally vertically extending non-magnetic receptacle, a feed device operable when actuated to feed objects made of magnetic material to and through said receptacle, utilization means to accept such objects from said receptacle and allowing the objects to stack up in said receptacle when the objects are being fed to said receptacle by said feeding device, first coil means extending about said receptacle at a selected minimum height for the objects in said receptacle, second coil means extending about said receptacle at a selected maximum height for the objects in the receptacle, said first and said second coil means being electrically connected in a reactance bridge circuit, means for coupling a signal source to said reactance bridge circuit, switching means connected to actuate and de-actuate said feeding device, and means coupling said reactance bridge circuit to said switching means for actuating said feeding device to supply objects of magnetic material to said receptacle when the level of objects in said receptacle falls below said minimum height and for de-actuating said feeding device to stop the supplying of said objects to said receptacle when the level of objects in said receptacle rises above said maximum height, said objects acting as a core for said coil means when present therein whereby said first and said second coil means have different impedance values when said objects are present and not present therein, said switching means including alternating current semi-conductor switch means adapted to be connected in circuit with said feeding device, direct current semi-conductor switch means connected by said coupling means for said switching means to said bridge circuit, and relay means connected to said direct current switch means and having contacts connected to said alternating current switch means for actuating and de-actuating the same.

2. A level control system comprising a generally vertically extending non-magnetic receptacle, a feeding device operable when actuated to feed objects made of magnetic material to and through said receptacle, utilization means to accept such objects from said receptacle and allowing the objects to stack up in said receptacle when the objects are being fed to said receptacle by said feeding device, first sensing coil means extending about said receptacle at a selected minimum height for the objects in said receptacle, second sensing coil means extending about said receptacle at a selected maximum height for the objects in the receptacle, a reactance bridge circuit in which said first and second coil means are electrically connected, transformer means for coupling a signal source to said reactance bridge circuit, switching means connected to actuate and de-actuate said feeding device, and means coupling said reactance bridge circuit to said switching means for actuating said feeding device to supply objects of magnetic material to said receptacle when the level of objects in said receptacle falls below said minimum height and for de-actuating said feeding device to stop the supplying of said objects to said receptacle when the level of objects in said receptacle rises above said maximum height, said objects acting as a core for said coil means when present therein whereby said first and said second coil means have different impedance values when said objects are present and not present therein, said transformer means having primary winding means and also having secondary winding means having a tap therein, said secondary winding means being connected in said reactance bridge circuit with portions thereof on opposite sides of said tap serving as arms of said bridge circuit, first balancing coil means serially connected with said first sensing coil means so that these coil means form two arms of said bridge circuit, and second balancing coil means serially connected with said second sensing coil means so that these coil means form two additional arms of said bridge circuits in parallel with the other arms, said switching means including electron device means connected to at least a portion of said secondary winding means, with said electron device means including two control portions respectively connected to a point between said two first coil means and a point between said two second coil means, so that said switching means is operated to actuate said feeding device when both of said control portion receive signals representing a predetermined condition of said bridge circuit.

3. A control circuit comprising first sensing coil means for receiving variable core means, a second sensing coil means for receiving variable core means, a reactance bridge circuit in which said first and second coil means are electrically connected, transformer means for coupling a signal source to said reactance bridge circuit, switching means connected to actuate and de-actuate an operating device, and means coupling said reactance bridge circuit to said switching means, said switching means including alternating current semi-conductor switch means adapted to be connected in circuit with said operating device, direct current semi-conductor switch means connected by said coupling means for said switching means to said bridge circuit, and relay means connected to said direct current switch means and having contacts connected to said alternating current switch means for actuating and de-actuating the same.

4. A control circuit as claimed in claim 3 in which said transformer means has primary winding means and also has secondary winding means having a tap therein, said secondary winding means being connected in said reactance bridge circuit with portions thereof on opposite sides of said tap serving as arms of said bridge circuit, first balancing coil means serially connected with said first sensing coil means so that the two first coil means form two arms of said bridge circuit, and second balancing coil means serially connected with said second sensing coil means so that the two second coil means form two additional arms of said bridge circuit in parallel with the other arms.

5. A control circuit as claimed in claim 4 in which said direct current semi-conductor switch means includes two semi-conductor controlled rectifiers having anode-to-cathode portions connected between said tap and another portion of said secondary winding means, said semi-conductor controlled rectifiers respectively having control portions connected respectively to a point between said two first coil means and a point between said two second coil means, so that said switching means is operated to actuate said control device when both of said control portions receive signals representing a predetermined condition of said bridge circuit.

6. A control circuit as claimed in claim 5 in which said switching means is operated to actuate said control device when said bridge circuit is in a predetermined unbalanced condition.

7. A control circuit as claimed in claim 6 in which said relay means has contacts connected across the anode-to-cathode portion of one of said semi-conductor controlled rectifiers for keeping said relay means in an actuated condition after actuation thereof by said controlled rectifier means in response to said signals until said bridge circuit reaches a balanced condition.

8. A control circuit as claimed in claim 4 in which said alternating current semi-conductor switch means is a triac device.

References Cited

UNITED STATES PATENTS

| | | | |
|---|---|---|---|
| 2,114,297 | 4/1938 | Grover | 193—32 |
| 2,571,576 | 10/1951 | Hopkins et al. | 221—175 |
| 2,863,546 | 12/1958 | Josefowicz | 221—175 X |

SAMUEL F. COLEMAN, Primary Examiner